(12) United States Patent
Granborg

(10) Patent No.: US 6,441,343 B1
(45) Date of Patent: Aug. 27, 2002

(54) HEATING SYSTEM FOR STRUCTURES

(76) Inventor: Bertil S. M. Granborg, 312 Po'opo Pl., Kailua, HI (US) 96743

( * ) Notice: Subject to any disclaimer, the term of this patent is extended or adjusted under 35 U.S.C. 154(b) by 0 days.

(21) Appl. No.: 08/777,515

(22) Filed: Dec. 30, 1996

Related U.S. Application Data

(63) Continuation of application No. 08/158,931, filed on Nov. 29, 1993, now abandoned, which is a continuation-in-part of application No. 07/544,319, filed on Jun. 27, 1990, now Pat. No. 5,266,773.

(51) Int. Cl.$^7$ .................................................. H05B 1/02
(52) U.S. Cl. ...................... 219/202; 219/204; 219/494; 392/469
(58) Field of Search ................................ 219/201–207, 219/494, 495, 505, 660, 670, 635, 61.2; 392/469

(56) References Cited

U.S. PATENT DOCUMENTS

| | | | | |
|---|---|---|---|---|
| 3,263,063 A | * | 7/1966 | Marriott et al. | 219/522 |
| 3,469,072 A | * | 9/1969 | Carlson | 219/202 |
| 3,509,316 A | | 4/1970 | Fresolo | |
| 3,764,779 A | | 10/1973 | Kadoya et al. | |
| 3,922,415 A | * | 11/1975 | Dexter | 428/133 |
| 4,081,737 A | * | 3/1978 | Miyahara | 320/2 |
| 4,585,178 A | * | 4/1986 | Arzt | 241/23 |
| 4,645,906 A | * | 2/1987 | Yagnik et al. | 219/301 |
| 4,667,781 A | * | 5/1987 | Lilley et al. | 219/202 |
| 4,845,329 A | * | 7/1989 | Vaz et al. | 219/10.81 |
| 5,266,773 A | * | 11/1993 | Granborg | 219/202 |
| 6,142,707 A | * | 11/2000 | Bass et al. | 404/158 |

OTHER PUBLICATIONS

E. Hallen, Electromagnetic Theory, pp. 354–365, John Wiley & Sons, Inc., New York, 1962.

L.W. Matsch and J.O. Morgan, Electromagnetic and Electromechanical Machines, pp. 102–104, 3rd Edition, Harper and Row, New York, 1986.

\* cited by examiner

Primary Examiner—Mark Paschall
(74) Attorney, Agent, or Firm—Thomas J. Tighe

(57) ABSTRACT

Low voltage, high current electrical energy is supplied in a closed conductive loop. Preferably, the current is induced into the loop by a transformer. The loop has, at least in part, one, or a series of, conductive elements of a structure to be warmed. The amount of current is sufficient in relation to the inherent resistivity of the elements to cause the generation of heat within the elements. Preferably the current is an alternating current of a frequency which causes a majority of the current to travel at or near the skin of the elements in order to increase the effective resistivity of the elements and thereby increase the generation of heat therein, primarily around the skin of the elements.

20 Claims, 4 Drawing Sheets

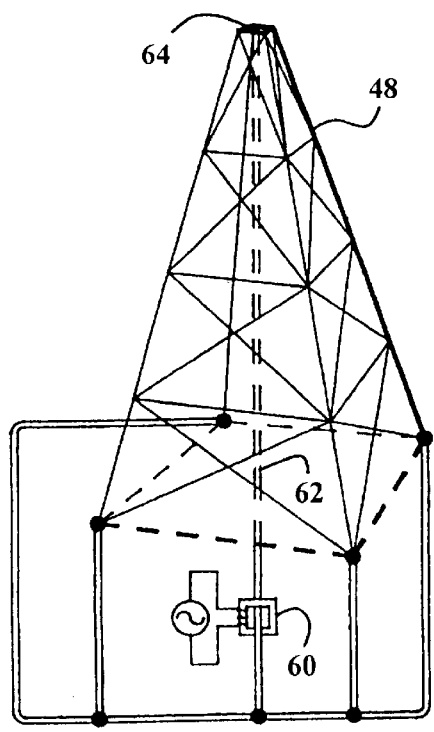
FIG. 9
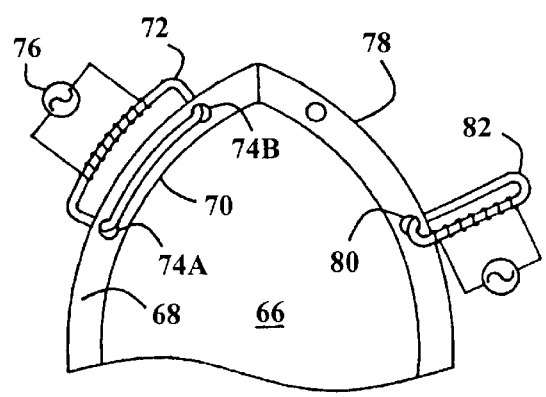
FIG. 10
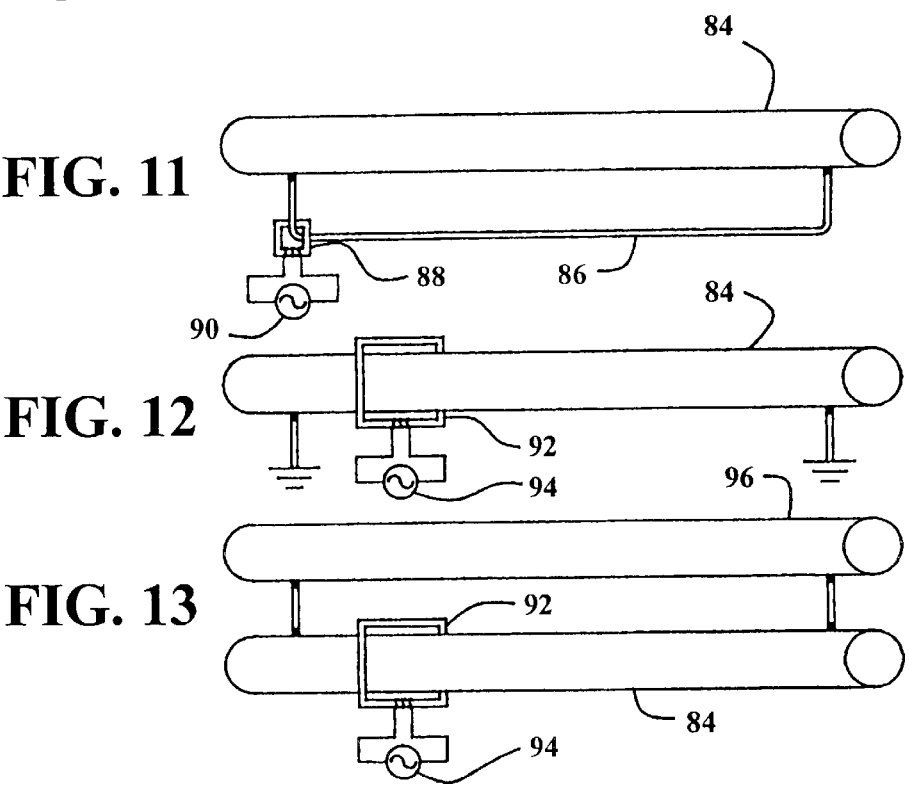
FIG. 11
FIG. 12
FIG. 13

HEATING SYSTEM FOR STRUCTURES

This is a Continuation of application Ser. No. 08/158,931, filed Nov. 29, 1993 now abandoned which is a continuation-in-part of Ser. No. 07/544,319, filed Jun. 27, 1990 now U.S. Pat. No. 5,266,773 by Bertil S. M. Granborg. The entire disclosure therein is incorporated herein by reference.

BACKGROUND OF THE INVENTION

This invention relates to devices for using the inherent resistivity of electrically conductive elements of a structure to generate heat within the structure to keep them from becoming inoperable or damaged due to a cold and/or freezing environment.

SUMMARY OF THE INVENTION

This invention presents a device for generating heat in an electrically conductive element of a structure comprising a means for causing an alternating current through said element, the current being sufficient in relation to an inherent resistivity of said element to generate a desired amount of heat. The desired amount of heat will be that amount sufficient to prevent damage or icing under the circumstances. The frequency of the current is preferably high enough to cause at least a majority of the current carriers to travel on and within a skin portion of said element for more efficient surface heating. The alternating current can be induced and a means for inducing the current can be a source of alternating voltage which is transformed into the alternating current, the alternating voltage being applied to a primary winding of a transformer and the element or elements being serially within an electric current loop, i.e. a closed circuit, of a secondary winding of the transformer.

An object of this invention is to provide a means for generating heat within one or more electrically conductive elements of a structure and thereby heat the structure without the use of any dedicated heating elements, that is, elements whose only function is to generate heat such as heating coils and the like.

Further objects of this invention will be discussed and/or will be readily discernable from a reading of the specification and claims herein.

BRIEF DESCRIPTION OF THE DRAWINGS

FIGS. 4, 5 and 9 illustrate the application of this invention to towers having conductive structural members.

FIGS. 7 and 10 illustrate application of this invention to a ship's bulwark.

FIGS. 11–13 illustrate application of this invention to pipes, such as oil carrying pipes.

DESCRIPTION OF THE PREFERRED EMBODIMENTS

The basic principle is to provide heat to structures to prevent them from becoming inoperable or destroyed due to temperatures below zero degree Centigrade or due to ice accretion. In the preferred embodiments described herein, alternating electrical energy is applied to the primary of a stepdown transformer in which a secondary winding produces high current and low voltage in a circuit made up of structural elements or sequences of them serially connected. The high current preferably alternates at a frequency high enough to generate heat by the resistive losses close to the surface of the conductive elements due to skin effect, which concentrates the current at or near the surface, i.e. "skin."

Figures 1, 2:
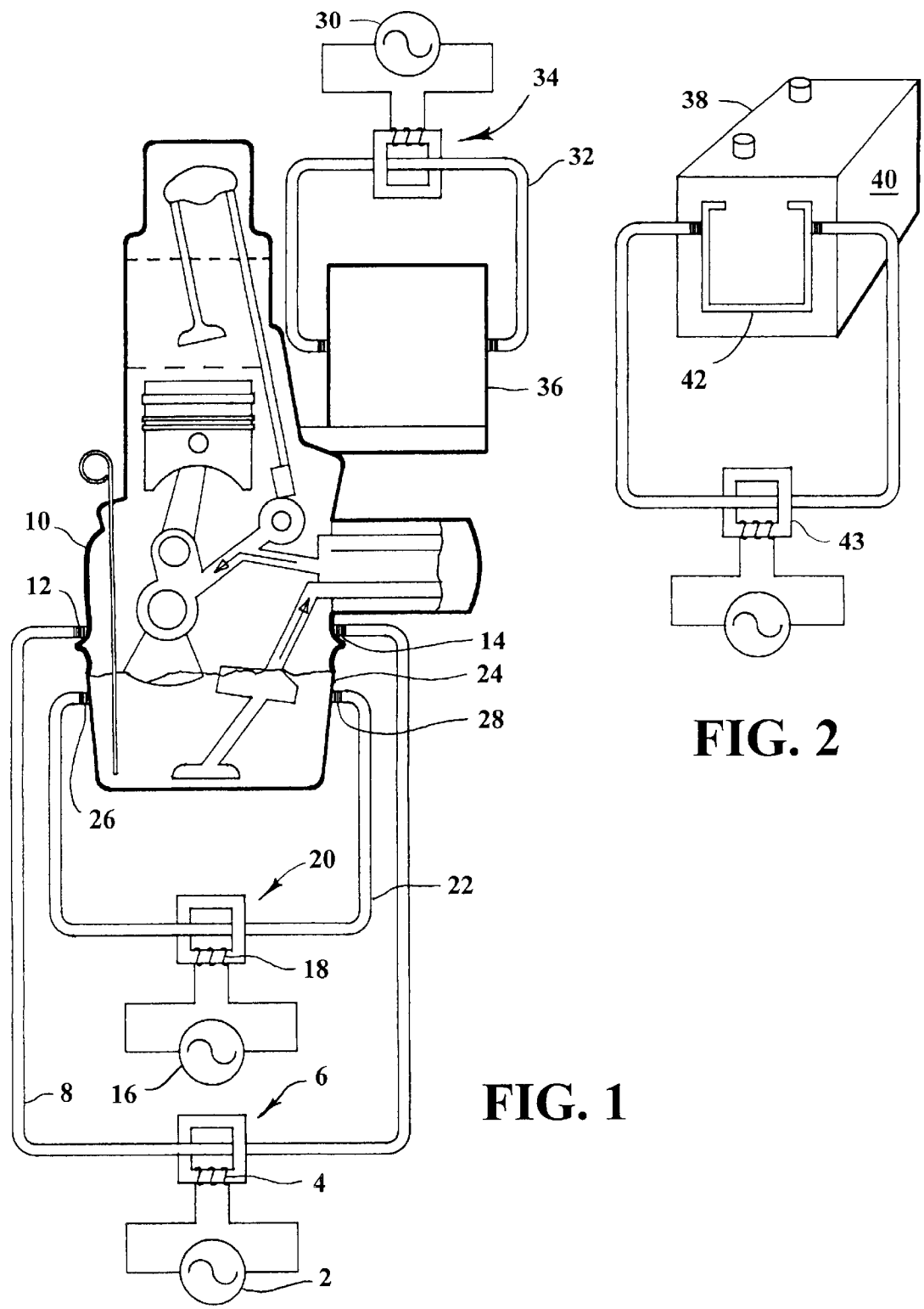
FIG. 1 illustrates the application of this invention to an engine block, an oil pan, and a carburetor.
FIG. 2 illustrates the application of this invention to a conductive casing for a battery.

FIG. 1 illustrates this invention applied as an engine block heater, oil pan heater and carburetor heater. A source of alternating voltage 2 energizes a primary winding 4 of a transformer, generally designated 6. The secondary comprises basically one conductor 8 having one end electrically connected to a first side of an engine block 10 at connection 12. The other end of the conductor is electrically connected to the second and opposite side of engine block at connection 14. The engine block being typically either cast iron or cast aluminum is electrically conductive and so a current induced in the secondary conductor 8 will flow from the first to the second side of the engine block, and if the frequency of the current is sufficiently high, skin effect will take place effectively increasing the inherent resistivity of the engine block. The inherent resistivity will generate heat within the engine block warming it.

Referring again to FIG. 1, a source of alternating voltage 16 energizes the primary winding 18 of a second transformer, generally designated 20. The secondary of the transformer is a single conductor 22 which has its opposite ends connected to opposite sides of an oil pan 24 at connection points, 26 and 28. Typically oil pans are made from steel, or other conductive alloy, and are therefore conductive and have an inherent resistivity. Current induced in the secondary conductor 22 will flow from one side of the oil pan to the other and generate heat therein due to the pan's inherent resistivity. One transformer could be used for heater both the block and the oil pan if proper electrical connections are provided between them.

Referring again to FIG. 1, also illustrated is a carburetor heater, intended to prevent moisture condensation. A source of alternating voltage 30 induces a current in single conductor 32 by means of a transformer, generally designated 34. The ends of the conductor 32 are connected to opposite points of a carburetor 36. Carburetors are typically made from cast iron, steel or aluminum and are therefore conductive, and therefore have inherent resistivity which can be used to generate heat in the manner previously discussed.

FIG. 2 illustrates this invention applied as a battery 38 heater. In this case the battery has an outside insulation case 40 and an inside partial metal case 42 connected across the secondary of a transformer 43. The metal case is heated by resistive losses, particularly in the skin, according to the principles of this invention as explained above.

Figure 3:
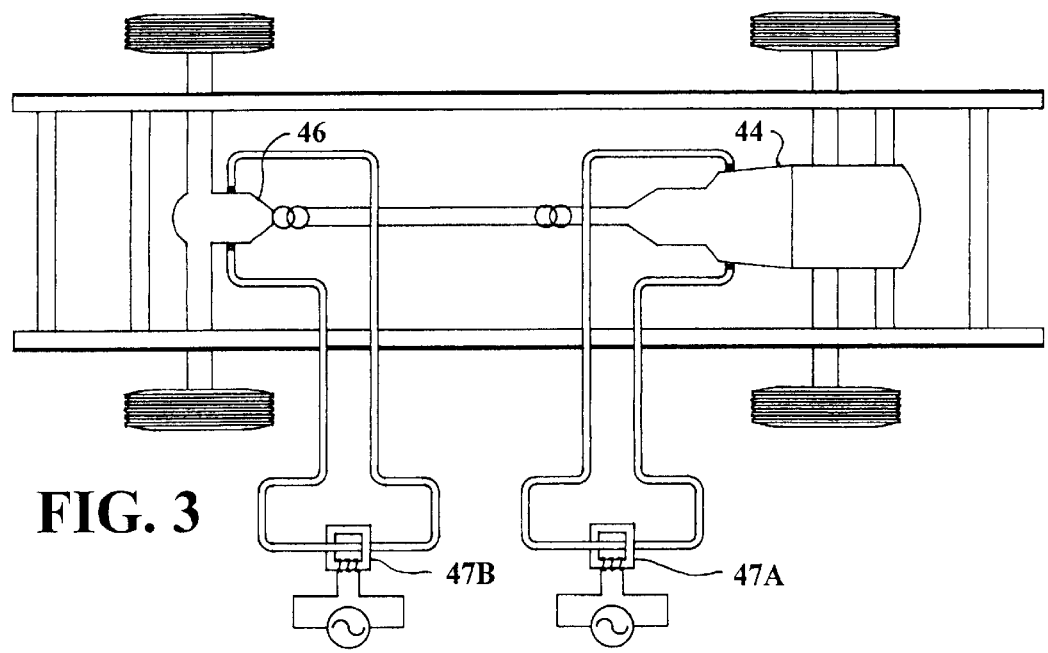
FIG. 3 illustrates the application of this invention to a vehicle's transmission and gear box, and the vehicle's drive train differential.

FIG. 3 illustrates this invention applied to heating the casings of a transmission/gear box 44 and a differential 46 via transformers 47A and 47B, respectively, according to the principles of this invention. The secondary connections are made on opposite sides of the casings.

Figure 4:
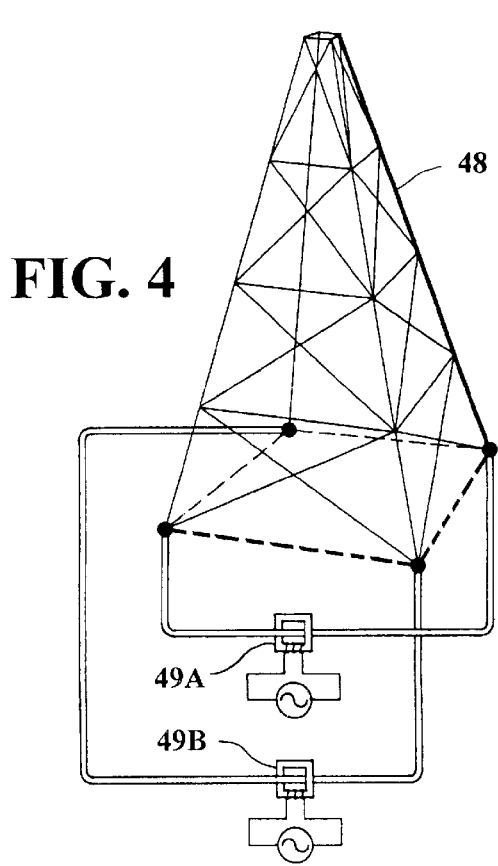
Figure 5:
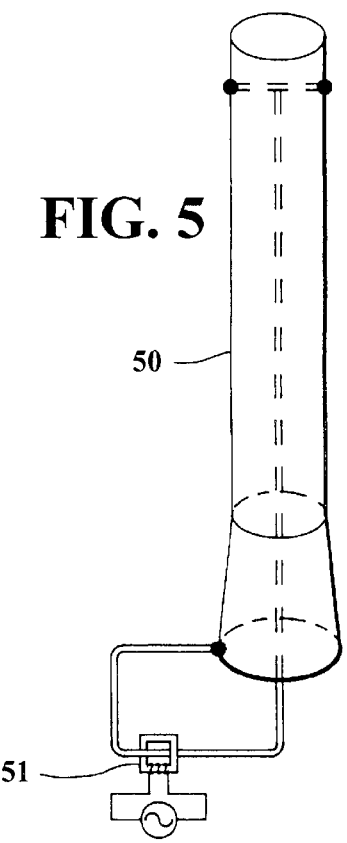
Figure 6:
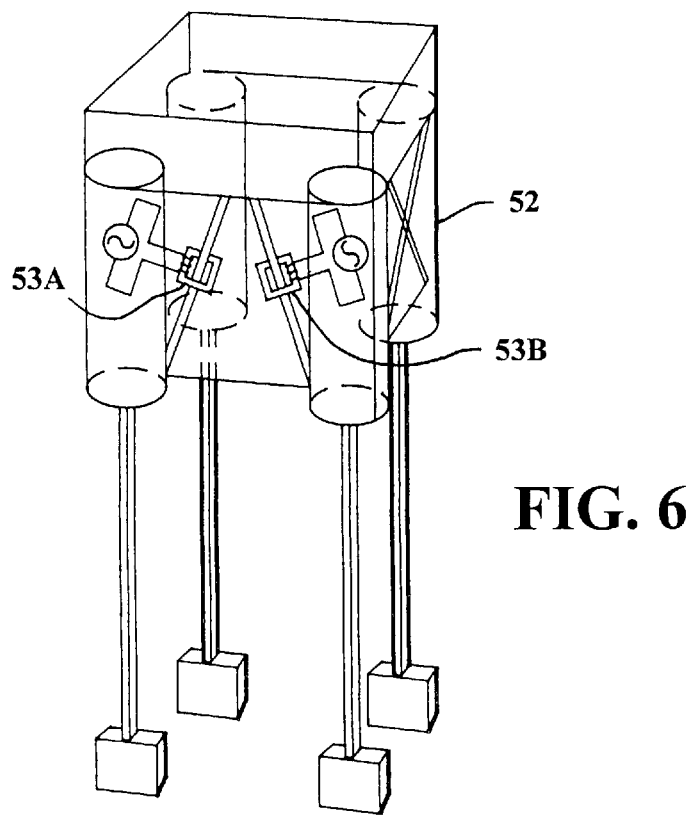
FIG. 6 illustrates the application of this invention to an oil drilling platform.

The conductive structural members of an antenna tower 48 is illustrated in FIG. 4 as being heated via transformers, 49A and 49B, according to the principles discussed above. FIG. 5 illustrates a transmission line tower 50 heated via transformer 51, and oil rig 52 in FIG. 6 is illustrated to have structural members being heated via transformers 53A and 53B according to this invention. There are several different variations of these structures and the applications of the heaters must therefore be custom made in each case.

Figure 7:
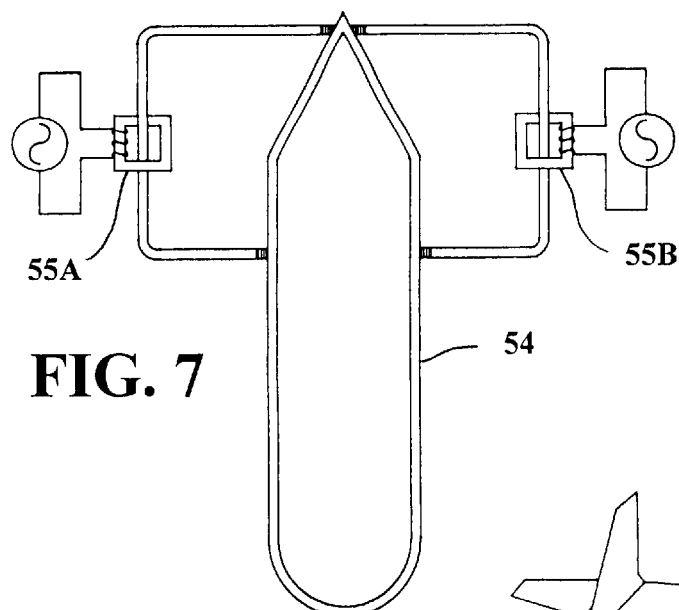

FIG. 7 illustrates this invention applied to heat a bulwark 54 of a boat or ship. Transformers 55A and 55B are used to induce alternating high current in respective sides of the vessel. Similar arrangements can be made for the deck, auxiliary equipment or superstructure of the vessel.

Figure 8:
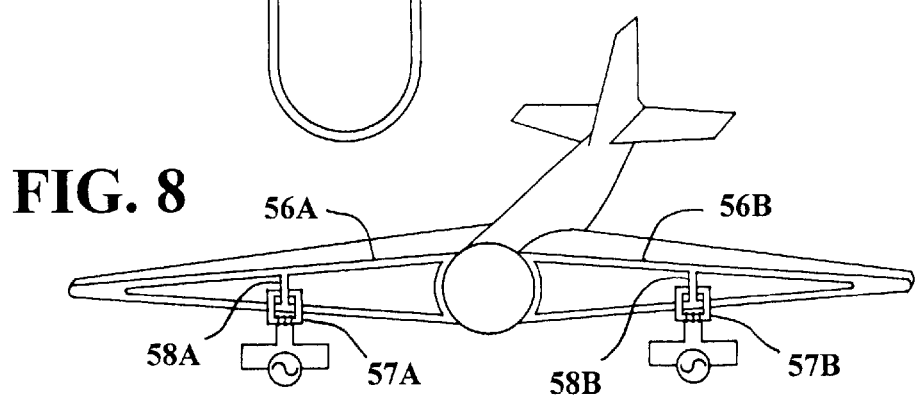
FIG. 8 illustrates application of this invention to the wing frames of an aircraft.

FIG. 8 illustrates one configuration for heating the conductive wing frames 56A and 56B of an aircraft via transformers 57A and 57B respectively. In this case struts 58A and 58B have current induced directly into them, and each causes the current to flow through connected frame loops. Similar arrangements can be made for the wing and tail surfaces, conductive control surfaces, conductive engine components, conductive landing gear components or other auxiliary equipment of the air vessel.

Referring to FIG. 9, an alternative configuration for heating an antenna tower 48 is illustrated. Contrary to the configuration of FIG. 4, only one transformer 60 is used to induce a current in a single conductor 62. The conductor 62 is connected at one end to the apex 64 of the tower, and at an opposite end to all four tower support legs at their base. In the configuration illustrated in FIG. 4, each transformer induced current in conductors connected to diagonally opposite pairs of legs.

Referring to FIGS. 7 and 10, the configurations in FIG. 10 require less current than the configurations illustrated in FIG. 7. On one side of a ship's deck 66 a bulwark 68 is heated by having a segment 70 of it have current induced therein by having a core 72 of a transformer enclose the segment by means of holes 74A and 74B defined by the bulwark through which the core extends. An alternating voltage source 76 creates varying magnetic flux in the core which cuts the bulwark segment 70 and thereby induces current therein. This current then heats the conductive bulwark through resistive losses preferably in the skin of the bulwark.

Referring again to FIG. 10, on the opposite side of the deck 66 is a second bulwark 78 which defines only one hole 80 through which the core 82 of a transformer extends. As already noted, similar arrangements can be made for the deck, auxiliary equipment or superstructure of the vessel.

Referring to FIGS. 11–13, illustrated are pipes, such as oil pipes, which can be heated according to this invention. FIG. 11 illustrates a conductive pipe 84 having its opposite ends connected via a single conductor 86. This conductor is in the secondary of a transformer 88 whose primary is energized by alternating electrical energy source 90. The pipe is a segment in the secondary of the circuit of the transformer and therefore carries current induced into the secondary. The current according to the principles of this invention, as discussed above, generates heat within the pipe length.

Referring to FIG. 12, it is the same pipe 84 but in this configuration its opposite ends are connected to a conductive medium such as ground. A core 92 of a transformer surrounds the pipe and when alternating electrical energy source 94 energizes primary windings wrapped around the core, the core will induce a current in the conductive pipe, thereby heating it according to the principles discussed above.

Referring to FIG. 13, the pipe 84 is in the secondary circuit of a transformer 92, as previously discussed with respect to FIG. 12, but in this case the opposite ends of the pipe are not connected to a conductive medium but rather to a second conductive pipe 96 which completes the secondary loop. In this way, both pipes are heated by a single transformer according to the principles as discussed above.

It should be realized that the pipes illustrated in FIGS. 11–13 would necessarily be covered by electrical insulation material. It should further be realized that the conductive medium referenced with respect to FIG. 12 can also be a conductive medium such as sea water or any other conductive liquid medium as well as any conductive solid medium.

In operation, a voltage is applied to the primary of the transformer causing current through its primary windings. This induces a current into the secondary winding, which is a high-current low-voltage circuit, by means of well known transformer induction principles. Since it is a stepdown transformer, a current gain is felt in the secondary. By proper selection of the primary winding count, the core material of the transformer, and the voltage levels, the current gain can be on the order of hundreds of amperes, enough to generate heat when opposed by the inherent resistivity of a structure's element or elements in the circuit of the transformer's secondary winding, preferably one turn. The high alternating current will generate heat by the resistive losses close to the surface of the conductive elements due to the skin effect, which concentrates the current at or near the surface.

For the purpose of system design the electrical impedance of a cylindrical metal bar is calculated by means by Bessel-type differential equations. The electrical impedance of a solid cylindrical bar is as follows:

$$Z = R + j\omega L = \frac{Hl}{2\pi\alpha}\varrho(1+j) \text{ ohm}$$

$$\text{where } H = \sqrt{\frac{0.5\omega\mu\mu_o}{\varrho}}$$

$\alpha$ = radius  $\omega = 2\pi f (f = \text{frequency in Hz})$
$l$ = length  $\mu$ = relative permeability
$\varrho$ = specific resistivity  $\mu_o = 4\pi \times 10^{-7}$ This formula is valid for large H×α.
For comparison the DC resistance is:

$$R_o = \frac{l}{\pi\alpha^2}\varrho \text{ ohm}$$

A solid iron bar was theoretically analyzed and tested as follows:
α=0.9525 cm
l=0.67 m
q=0.119×10$^{-6}$ ohm m
f=60 hz
$\mu$=815
which yields:
Z=2.399677×10$^{-3}$ ohm, and
R$_o$=0.02797×10$^{-3}$ ohm.
The measured data was:
I=250 A (amperes)
V=0.6 V (volts)
S=VI=150 VA (complex power)
P=S COS Θ=150(0.707)=106 W
The bar could maintain an estimated 75° C.temperature and showed a considerable heat capacity.

The alternating voltage sources as described herein can be any alternating voltage source of sufficient capacity as "sufficient" is defined in this specification.

It is necessary to have flexible connections between any moving parts in order to have good electrical contact between the metal parts and to avoid them being welded together. (A few hundred amperes are to be expected.) In order to optimize the operating cost, a control system of conventional design can be used with temperature sensors and switches operating such that heating takes place only below freezing temperatures, or if so desired, only during intermittent periods. The transformers can also be designed such that they have minimum leakage.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

I claim:

1. A system for generating heat within a structure comprising:
   (a) at least one element of the structure that is electrically conductive, said at least one element being a functional member of said structure,
   (b) means for connecting said at least one element as a serial member in an electric circuit loop, and
   (c) means for causing an alternating electric current in said electric circuit loop of sufficient frequency to cause at least a majority of current in said at least one element to be constricted at or near the surface of said at least one element, the current being of sufficient magnitude in relation to an inherent resistivity of said at least one element due to skin effect to generate a desired amount of heat at or near said surface of said at least one element.

2. The system according to claim 1 wherein said means for causing an alternating electric current comprises:
   (a) a source of electrical energy, and
   (b) means for transforming the electrical energy into said alternating electric current.

3. The system according to claim 2 wherein said means for transforming the electrical energy into said alternating electric current comprises an electrical transformer, the electrical energy being applied to a primary winding of said transformer, and wherein said at least one element is a serial member of an electric circuit loop of a secondary winding of said transformer.

4. The system according to claim 3 wherein said secondary winding is a single turn.

5. The system according to claim 1 wherein said structure is a motor vehicle's engine and said at least one element comprises an engine block.

6. The system according to claim 1 wherein said structure is a motor vehicle's engine and said at least one element comprises an oil sump enclosure.

7. The system according to claim 1 wherein said structure is a motor vehicle's engine and said at least one element comprises a fuel supply mechanism.

8. The system according to claim 1 wherein said structure is a battery and said at least one element comprises a conductive casing.

9. The system according to claim 1 wherein said structure is a self-propelled vehicle's drive train and said at least one element comprises a casing enclosing a portion of said drive train.

10. The system according to claim 1 wherein said structure is a tower having structural members and said at least one element comprises at least one of said structural members.

11. The system according to claim 1 wherein said structure is a water vessel and said at least one element comprises a bulwark of said vessel.

12. The system according to claim 1 wherein said structure is an air vessel having structural members supporting a portion of the vessel susceptible to icing, and said at least one element comprises at least one of said structural members.

13. The system according to claim 1 wherein said structure is a pipe and said at least one element comprises a conductive wall of said pipe.

14. The system according to claim 1 wherein said structure is a water vessel and said at least one element comprises a deck of said vessel.

15. The system according to claim 1 wherein said structure is a water vessel and said at least one element comprises auxiliary equipment of said vessel.

16. The system according to claim 1 wherein said structure is a water vessel and said at least one element comprises the superstructure of said vessel.

17. The system according to claim 1 wherein said structure is an air vessel and said at least one element comprises engine components of said vessel.

18. The system according to claim 1 wherein said structure is a self-propelled vehicle's braking mechanism and said at least one element comprises brake coupling linkage.

19. The system according to claim 1 wherein said structure is a self-propelled vehicle's braking mechanism and said at least one element comprises a brake shoe means for applying friction to a rim of a vehicle wheel.

20. A system for generating heat within a structure comprising:
   (a) at least one element of the structure that is electrically conductive, the primary function of said at least one element being other than to generate heat,
   (b) means for connecting said at least one element as a serial member in an electric circuit loop, and
   (c) means for causing a single phase alternating electric current in said electric circuit loop of sufficient frequency to cause at least a majority of current in said at least one element to be constricted at or near the surface of said at least one element, the current being of sufficient magnitude in relation to an inherent resistivity of said at least one element to generate a desired amount of heat due to skin effect at or near said surface of said at least one element.

* * * * *